United States Patent

[11] 3,545,548

| [72] | Inventor | Glen R. Hadfield |
| | | 4643 Sherwood, Oxford, Michigan 48051 |
| [21] | Appl. No. | 702,742 |
| [22] | Filed | Feb. 2, 1968 |
| [45] | Patented | Dec. 8, 1970 |

[54] MEANS FOR ROLLING SOD AND FOR POSITIONING THE ROLLS FORMED
6 Claims, 4 Drawing Figs.

[52] U.S. Cl. ............................................. 172/19; 56/473.5
[51] Int. Cl. ............................................. A01b 45/04
[50] Field of Search ............................................. 172/19, 20, 675, 668, 759, 228, 29, 31, 19; 56/473.5

[56] References Cited

UNITED STATES PATENTS

| 67,814 | 8/1867 | Stafford | 172/674X |
| 2,676,525 | 4/1954 | Oerman | 172/228 |
| 3,164,211 | 1/1965 | Scott | 172/19 |
| 776,844 | 12/1904 | Huddlemeyer et al. | 172/20 |

FOREIGN PATENTS

| 665,955 | 2/1952 | Great Britain | 172/20 |

Primary Examiner—Robert E. Bagwill
Assistant Examiner—Stephen C. Pellegrino
Attorney—Berman, Davidson and Berman ABSTRACT: A reel responsive to forward movement of the vehicle on which it is placed for accelerating the rolling of sod at a rate greater than the forward movement of the vehicle, including plowlike members following the vehicle for turning each roll of sod from a transverse position axially across the path of the vehicle to a position in which the axis of the sod roll is parallel to the direction of advance of the vehicle.

PATENTED DEC 8 1970 3,545,548

INVENTOR.
GLEN R. HADFIELD,

BY
Berman, Davidson & Berman
ATTORNEYS.

INVENTOR.
GLEN R. HADFIELD

MEANS FOR ROLLING SOD AND FOR POSITIONING THE ROLLS FORMED

Sod has become one of the major crops of American agriculture. The growth of "urban sprawl" has produced an irresistible demand for sod and the rising cost of labor has produced an equally irresistible demand for mechanization of the sod harvesting process. As a matter of fact, at the present time it would be quite impossible to recruit labor to harvest sod by completely manual methods.

In my presently pending application, Ser. No. 609,838, filed Jan. 17, 1967, entitled FREEING, SEVERING AND ROLLING UP SOD, (now U.S. Pat. No. 3,387,666, dated June 11, 1968) I have disclosed an improvement upon the first forward step taken in the sod harvesting business which consisted of a commercially satisfactory means for a complete severance of a continuous strip of sod by a self-impelled vehicle, accompanied by periodic transverse severance of the strip thus cut. In my application aforesaid, I disclosed an attachment for the machine just described, which would initiate by means of each operation of the transverse severing knife, a roll up of the sod and complete the same, first by a drag rake and second by a reel operating "counterclockwise" in a direction opposite to that of the forward movement of the cutter. The machine therein disclosed has been quite effective but in the use of the machine wherein the "counterclockwise" acceleration means was driven from the main power plant of the machine, I discovered that any slippage or interruption of forward motion of the machine nevertheless permitted the reel to continue operation at normal speed, whereby the dirt side of the sod being rolled was "scalped" greatly to the detriment of the particular roll being formed at the time.

It is further a fact that the rolls formed, if permitted to lie as formed, completely occupy the width of the strip being cut and as a result, anyone following the sod cutter and roller combination must either step over or upon the rolls formed. It is, therefore, a most considerable convenience if, when a roll is formed, it can be turned so that the axis of the roll becomes parallel to rather than transverse to forward motion of the rolling and cutting vehicle. Moreover, since consecutively formed sod rolls will be equally spaced in the direction of the vehicle movement the mechanical harvesting and loading of the rolls themselves if facilitated by this orientation of the rolls, which is a subject under consideration and will be the subject of a later application.

Accordingly, it is an object of this invention to provide means independent of the power source of the cutting and severing vehicle for accelerating and completing the formation of the sod roll.

It is a further object of this invention to provide means whereby each independent roll will have its axis turned approximately 90° degrees from parallelism with the forward motion of the vehicle to lie approximately midway of the strip with its axis parallel to the direction of the vehicle motion and approximately coincident with the center line of the strip.

It is a further object of this invention to provide means as aforesaid which will present the rolls of sod in equally spaced positions whereby to facilitate mechanical harvesting and loading of the rolls, thereby facilitating complete mechanization of the sod harvesting process.

The above and other objects will be made clear from the following detailed description taken in connection with the annexed drawings, in which.

Figure 1:
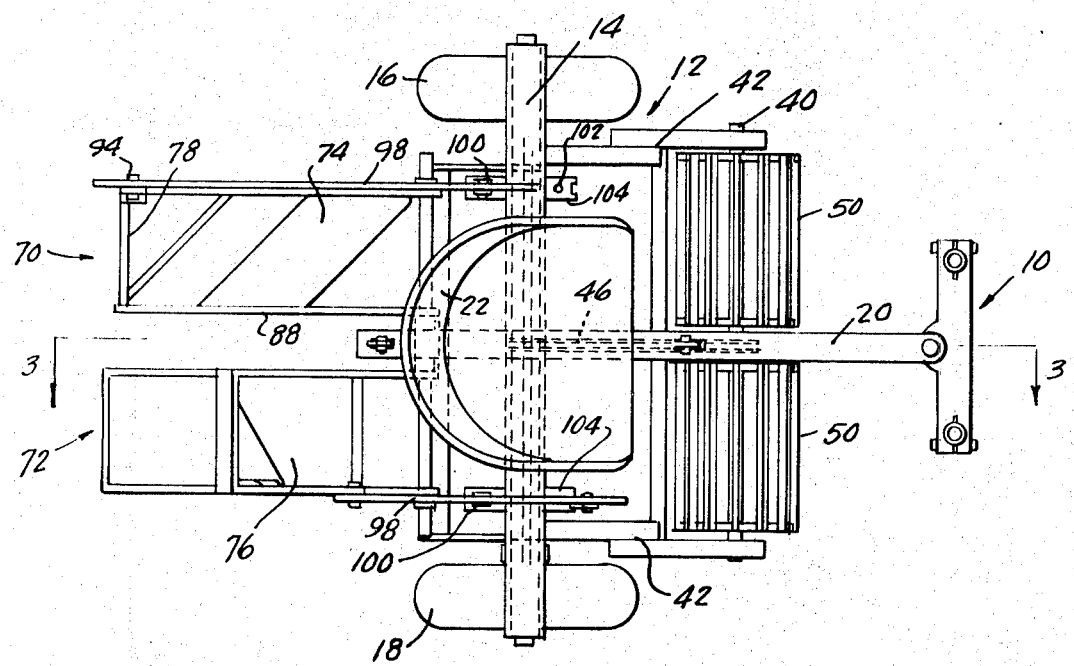
FIG. 1 is a top plan view, showing the roll accelerating and roll turning mechanisms for attachment to a sod cutting, severing and roll initiating machine, as disclosed in the application aforesaid, application Ser. No. 609,838, filed Jan. 17, 1967.
Figure 3:
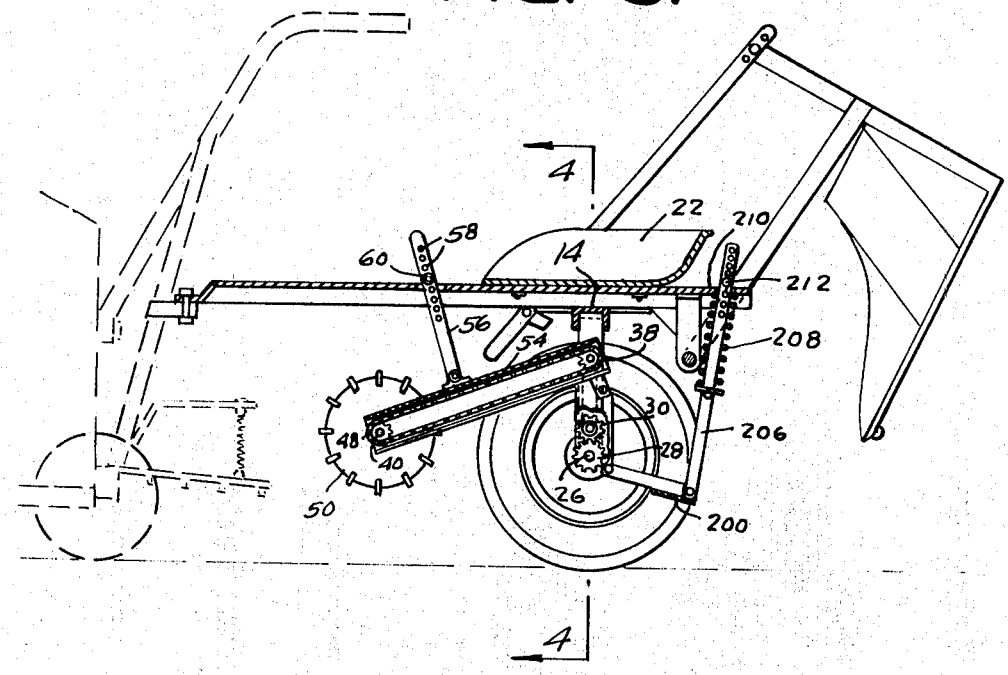
FIG. 3 is a partial section on the line 3–3 of FIG. 1.
Figure 4:
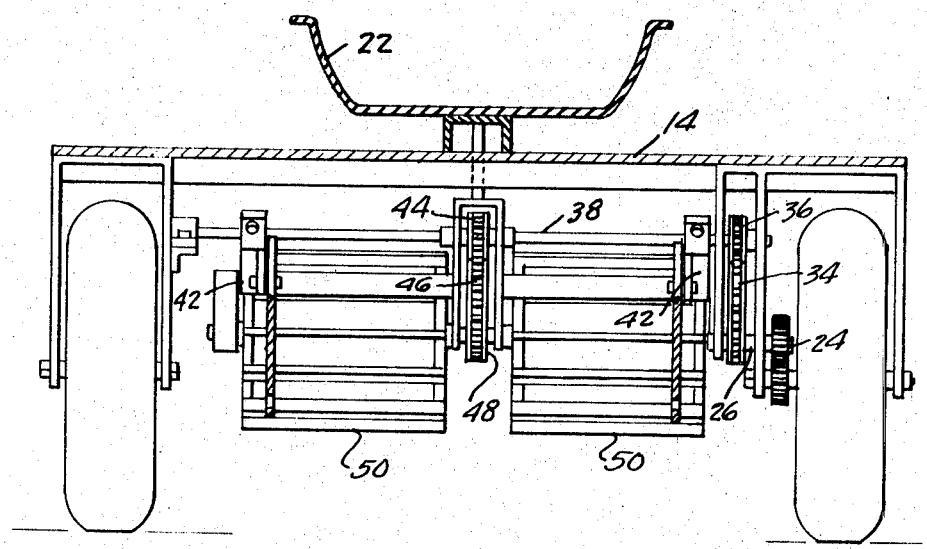
FIG. 4 is a partial section on the line 4–4 of FIG. 3.

Referring now to FIG. 1, the sod cutting and severing elements, to which the present device is attached, is designated generally by the numeral 10. The cutting, severing and roll initiating steps are followed by a pivoted rake attached to the machine, as shown in said U.S. Pat. No. 3,387,666. The present attachment, as a whole, is designated by the numeral 12. It comprises a U-shaped sulky frame 14 mounted on wheels 16 and 18 and having a drawbar 20 for attachment to the unit 10. A seat 22 is mounted on the frame 14. A stub shaft 24 is mounted in the frame 14 and in a bracket 25 above the axle 26 mounting the wheels 16 and 18. Pinions 28 and 30 on the shafts 24 and 26 rotate the shaft 24 counterclockwise, as seen in FIG. 3.

The opposite end of the stub shaft 24 carries a sprocket 32 which by a chain 34 drives a sprocket 36 secured to a cross-shaft 38. A shaft 40 is rotatably mounted in arms 42 which in turn are pivotally mounted on the cross-shaft 38 for rocking motion thereabout. A sprocket 44 is mounted about midway the length of cross-shaft 38 and, through a chain 46, drives a sprocket 48 on the shaft 40. By this arrangement, a pair of sod rolling reels 50 mounted on shaft 40 are rotated in the direction of the arrow 52 to accelerate the completion of each roll.

The reels 50 pivot with the arms 42 about the cross-shaft 38 to accommodate diametric expansion of the sod roll. An arm 54 (FIG. 3) is pivoted to both shafts 38 and 40. A link 56 is pivoted to the arm 54 and extends through a slot in the drawbar 20. At its upper end the link 56 has a series of holes 58, any one of which may receive a detent pin 60 whereby to limit, adjustably, the approach of the reels 50 to the ground.

As shown in FIG. 1, a pair of roll turners 70 and 72 are placed to act subsequent to action of the reel. Physically and pictorially, these are quite similar to the anciently familiar moldboard plow. The action, however, is entirely dissimilar. Applicant has been at considerable pains to eliminate any possibility of the plowsharelike members 74 and 76 digging into the earth, since any such digging abruptly would terminate the entire operation and further, would render the plowlike members 74 and 76 useless for their intended purpose.

It will be observed in FIG. 1 that the members are of "opposite hand" so that regardless of terrain, the completed rolls will be properly positioned for subsequent harvesting. Taking the member 70, with which the member 72 (except for the matter of hand) is identical, the member 70 comprises a back plate 78, lying in a plane parallel to the direction of the forward movement of the vehicle. The back plate 78 is substantially rectangular in the relationship of its top and bottom sides 80 and 82, respectively. Its forward end, however, is profiled to the horizontal projection of a plowshare.

The bottom plate 82, however, is substantially rectangular and to its forward end is welded a strip of rod or bar stock 84 (FIGS. 2 and 3) as a safeguard against any possible digging in of the structure 70. The plowsharelike plate 86 (which may be of double curvature) is welded or otherwise secured both to the back plate 78 and the bottom plate 82 and at its rearward end is welded or otherwise secured to a guide plate 86, which is also secured to the bottom plate 82.

Figure 2:
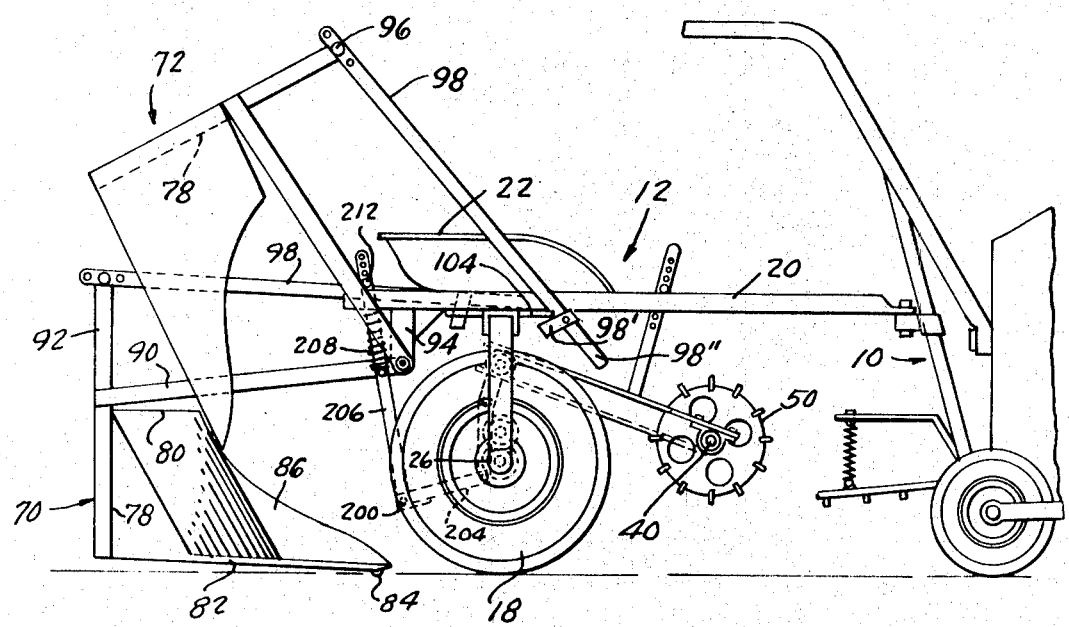
FIG. 2 is an elevation of the lower or left-hand side of FIG. 1.

An angle iron 90 has one leg 92, rigidly secured to the top edge of the back plate 78 and has its free end projecting beyond the leading edge of the back plate and pivoted to a bracket 94 on the sulky 12. The leg 92 of the angle bar terminates in a pivotal joint 96 to a link 98. Near its free end, the link 98 has a lug 98' which is optionally engageable with either of apertures 100 or 102 in a plate 104, secured to the cross member 46 of the sulky. The free end 98" of the link 98 is used as a handle to enable the operator to manipulate the plows. As shown in FIG. 2, such an arrangement permits either of the roll turning members to be placed in active 70 or inactive 72 position.

Combining the reels with the roll turners on a single sulky is of considerably importance. In the first place, it makes the reels strictly responsive to forward movement of the entire combination and incapable of independent movement apart from such forward movement. In the second place, the reels, turning opposite to forward movement of the combination, greatly accelerate the rolling action beyond the forward speed of the combination and thus serve to shorten the overall length of the combination. The sulky provides not only an ideal mounting and driving means for the reels but an equally ideal mounting means for the roll turners wherein it is easy to place either or both of the roll turners out of operation at any particular time. In making turns at the end of a cut, for example, it is important that the roll turners both be lifted out of the way.

A useful adjunct is shown in FIGS. 1, 2 and 3 as a crossbar 200 pivoted at each end to links 202 which, at their opposite ends, are pivoted to links 204 which are attached to the machine frame. The links 202 are also pivoted to vertical members 206 which are downwardly biased by springs 208. The links 206 pass through and the springs 208 bear upon frame members 210. Downward movement is limited by pins 212. The purpose of this arrangement is to provide a compressive force to the completed sod roll to prevent any spontaneous unrolling between the time the rolling action ceases and the plows encounter the completed roll.

While certain constructional details have been disclosed herein, it is not the intention to limit this invention to the precise details disclosed since many variations doubtless will occur to those skilled in the art. The invention, therefore, is to be limited only as set forth in the subjoined claims.

I claim:

1. A self-propelled sod harvesting machine which, during its forward advance, severs from the ground a continuous strip of sod of a predetermined width, cuts said strip into predetermined lengths and forms said cut lengths into consecutive spaced rolls having their axes transverse the direction of advance of said machine; a pair of horizontal, laterally spaced pivots mounted on said machine; a pair of roll turning means each mounted on one of said pivots for pivotal, independent movement toward and from the ground level, said roll turning means being of opposite hand and located so as to encounter and turn such rolls approximately through 90° either to right or left of the direction of advance of said machine and to locate the rolls with their axes approximately midway of the strip severed by the machine; mutually independent means on said machine for holding either of said roll turning means in a position away from the ground; means on said roll turning means to prevent penetration of the ground by each of said roll turning means, said roll turning means each comprising a plowlike member having a leading point located to initially encounter a roll near one end of said roll, and a sloping portion extending inwardly of the roll from said point, said sloping portion terminating short of the approximate axial center of said roll as the roll was originally encountered by said point.

2. The machine of claim 1 including means on said machine to exert downward pressure on each fully formed sod roll prior to the turning of such roll.

3. The machine of claim 1 including a two-wheeled sulky pivotally attached to said machine, said spaced, horizontal pivots being attached to said sulky.

4. The machine of claim 3 in which part of the sod roll forming portion of the machine is carried by the sulky.

5. The machine of claim 4 in which said part of said roll forming portion comprises a reel driven from a wheel of said sulky in a direction opposite the direction of advance of the machine.

6. The machine of claim 5 including means on the sulky to exert downward pressure on each fully formed sod roll prior to the turning of such roll.